US012668948B2

(12) United States Patent
Abenthung et al.

(10) Patent No.: US 12,668,948 B2
(45) Date of Patent: Jun. 30, 2026

(54) MOBILE WORKING MACHINE

(71) Applicant: Liebherr-Werk Telfs GmbH, Telfs (AT)

(72) Inventors: Andreas Abenthung, Oberperfuss (AT); David Lindenthaler, Hatting (AT)

(73) Assignee: LIEBHERR-WERK TELFS GMBH, Telfs (AT)

( * ) Notice: Subject to any disclaimer, the term of this patent is extended or adjusted under 35 U.S.C. 154(b) by 0 days.

(21) Appl. No.: 19/236,188

(22) Filed: Jun. 12, 2025

(65) Prior Publication Data

US 2026/0002339 A1 Jan. 1, 2026

(30) Foreign Application Priority Data

Jun. 27, 2024 (DE) ..................... 10 2024 118 226.1

(51) Int. Cl.
*E02F 9/22* (2006.01)
*F15B 15/18* (2006.01)

(52) U.S. Cl.
CPC .......... *E02F 9/2235* (2013.01); *E02F 9/2292* (2013.01); *F15B 15/18* (2013.01)

(58) Field of Classification Search
CPC .......... F04B 17/03; E02F 9/2235; F15B 15/18
See application file for complete search history.

(56) References Cited

U.S. PATENT DOCUMENTS 3,764,236 A * 10/1973 Carter .................. F04D 29/049 417/372
2022/0282718 A1* 9/2022 Hewitt .................. F04B 53/001

FOREIGN PATENT DOCUMENTS

JP H11512813 A * 11/1999 .............. F24V 40/10

* cited by examiner

*Primary Examiner* — Abiy Teka
(74) *Attorney, Agent, or Firm* — McCoy Russell LLP

(57) ABSTRACT

The disclosure relates to a mobile working machine, in particular a bulldozer or crawler loader, comprising a hydraulic system for providing a working function of the working machine, which comprises a hydraulic tank and at least one hydraulic pump, and an electric drive system with an electric motor for driving the hydraulic pump. According to the disclosure, the hydraulic pump is arranged inside the hydraulic tank and the electric motor is arranged on the outside of a housing of the hydraulic tank, wherein the electric motor is flange-mounted directly or via an intermediate piece on the housing and the hydraulic pump is attached to the electric motor or to the intermediate piece.

18 Claims, 6 Drawing Sheets

MOBILE WORKING MACHINE

CROSS REFERENCE TO RELATED APPLICATION

The present application claims priority to German Patent Application No. 10 2024 118 226.1 filed on Jun. 27, 2024. The entire contents of the above-listed application are hereby incorporated by reference for all purposes.

TECHNICAL FIELD

The present disclosure relates to a mobile working machine.

BACKGROUND

Mobile working machines often have two separate drives: a drive for the travelling function and a drive for the working function(s). The working function is usually provided by a hydraulic system with one or more hydraulic pumps, for example to raise and lower a boom using hydraulic cylinders, to turn an upper carriage, to operate a cable winch or, in the case of a crawler loader or bulldozer, to raise and lower a dozer blade or rear scarifier using hydraulic cylinders. In diesel-powered machines, the hydraulic pump for the working function (also known as the working pump) is driven by the diesel engine directly or via a transmission.

SUMMARY

Recently, there has been an increasing trend towards the electrification of working machines in order to reduce pollutant emissions and especially $CO_2$ emissions. In the case of electric working machines, a particularly compact installation of all components is necessary in order to provide sufficient installation space for the high-voltage batteries, fuel cell, voltage converters or similar.

The object of the present disclosure is therefore to enable a space-saving arrangement of the drive components for the working function in generic working machines.

According to the disclosure, this object is achieved by a mobile working machine as described herein.

Accordingly, a mobile working machine is proposed that comprises a hydraulic system for providing a working function of the working machine. In particular, at least one actuator of the working machine (e.g. one or more hydraulic cylinders for raising or lowering a dozer blade and/or for moving a rear scarifier) can be driven via the hydraulic system. The hydraulic system comprises at least one hydraulic pump (working pump) and a hydraulic tank, from which the hydraulic pump draws hydraulic oil and pumps it to at least one hydraulic consumer of the working machine.

The mobile working machine also comprises an electric drive system, which comprises an electric motor (working motor) for driving the at least one hydraulic pump. In addition, the electric drive system may comprise at least one electric traction motor and/or provide at least one other working function (e.g. brake chopper, low-voltage electrical system, etc.).

According to the disclosure, the at least one hydraulic pump is arranged inside the hydraulic tank. The electric motor is attached to the outside of a hydraulic tank housing and is flange-mounted to the hydraulic tank housing either directly or via an intermediate piece. The hydraulic pump connected to the electric motor is attached inside the hydraulic tank on the electric motor or on the intermediate piece, for example, flange-mounted.

The integration of the at least one hydraulic pump (for the sake of brevity, only the hydraulic pump in the singular is referred to below) in the hydraulic tank enables a particularly compact arrangement of the working motor, working pump and hydraulic tank and thus creates sufficient installation space in the working machine for the arrangement of further components such as an energy storage device, fuel cell(s), voltage converters and/or other components of the electric drive system. By installing the hydraulic pump in the hydraulic tank, no additional installation space is required for the hydraulic pump.

This takes advantage of the fact that the mounting location of the electric working drive on an electrically operated working machine is free and not restricted as is the case with the travel drive (which, for example, may be positioned on the drive sprocket of the crawler chassis on an electrically operated bulldozer). The combination of free positioning of the working pump and free positioning of the working motor is utilised according to the disclosure for advantageous compact integration in or on the hydraulic tank.

The working machine according to the disclosure can be, in particular, a bulldozer or a crawler loader. However, the working machine can also be another, at least partially electrified machine such as a telescopic handler, mobile crane or hydraulic excavator. In principle, any working machine with a hydraulic working function and an electric drive system with at least one electric working motor can be considered here.

In the following, the terms "hydraulic tank housing" and "tank housing", and the terms "hydraulic tank" and "tank" are used synonymously.

In one possible embodiment, it is provided that the hydraulic pump is submerged in hydraulic oil, which is in the hydraulic tank. The hydraulic pump is therefore a submersible pump that draws hydraulic oil directly from the surrounding hydraulic oil rather than via a suction line from a spaced tank. This eliminates the need for tubing for the intake oil, while at the same time ensuring that the intake pressure of the hydraulic pump is greater than 1 bar, for example.

The electric motor may comprise a rotor and a stator, which are not connected to the hydraulic oil. Thus, in particular, only the hydraulic pump is immersed in hydraulic oil in the present case, but not the electric motor (apart from possibly a part of the motor housing and/or an output shaft extending from a motor housing in an oil-tight manner).

In another possible embodiment, it is provided that the intermediate piece is designed as a flange or intermediate flange and is flange-mounted on the housing of the hydraulic tank from the outside. This enables easy installation and removal of the electric motor on the hydraulic tank.

Alternatively or additionally, it can be provided that the intermediate piece has an opening, through which a mechanical coupling or coupling device is guided between the electric motor and the hydraulic pump. The hydraulic pump is driven by the electric motor via the mechanical coupling, which may comprise a shaft in particular. The feed-through of the mechanical coupling is optionally not oil-tight. Instead, the inside of the tank may be sealed to the outside by attaching the hydraulic pump to the intermediate piece or to the motor housing of the electric motor and/or by attaching the electric motor or the intermediate piece to the housing of the hydraulic tank.

In another possible embodiment, it is provided that the intermediate piece (if this is provided) and/or a motor flange of the electric motor has at least one hydraulic feed-through, which is connected to a pressure outlet or pressure line of the hydraulic pump inside the hydraulic tank. The hydraulic oil conveyed by the hydraulic pump is routed to the outside through the hydraulic feed-through and fed to one or more consumers via a hydraulic line of the working machine. The hydraulic feed-through optionally has a hydraulic connection on the outside of the hydraulic tank, to which an external hydraulic line of the working machine is connected. This allows the external hydraulic line to be easily disconnected from the hydraulic feed-through or the hydraulic connection for maintenance or replacement of the hydraulic pump.

In another possible embodiment, it is provided that the electric motor comprises a rotationally drivable output shaft to which a drive shaft of the hydraulic pump is connected. The drive shaft and output shaft can be connected to each other via a coupling linkage and/or a transmission or connected to each other directly. In the case of a direct coupling, the output shaft is optionally designed as a hollow shaft, wherein the drive shaft of the hydraulic pump can be designed as a toothed shaft with teeth engaging in the hollow shaft. The reverse is also conceivable (i.e. the drive shaft of the hydraulic pump is a hollow shaft). This enables a particularly compact connection of the hydraulic pump on the electric motor.

In another possible embodiment, it is provided that the electric motor comprises a housing (motor housing) and the outlet of the output shaft from the motor housing is designed to be oil-tight. This separates the interior of the motor housing and, in particular, the rotor and stator of the electric motor from the oil volume of the tank interior.

Alternatively or additionally, the tank volume can be sealed at an attachment, for example, a flange connection, between the hydraulic pump and the electric motor or motor housing. In this case, the output shaft does not necessarily have to be sealed against the motor housing.

Optionally, the connection between the electric motor (or motor housing) and the hydraulic tank housing is designed to be oil-tight in each of the above-mentioned cases. If the motor housing is flange-mounted directly to the tank housing, this is in particular oil-tight. If the electric motor is connected to an intermediate piece and this is flange-mounted to the tank housing, this connection and/or the connection between the electric motor and the intermediate piece is designed to be oil-tight in particular.

The aforementioned oil-tight connections are sealed in particular using standard sealing elements such as elastomer seals (or a shaft seal in the case of the output shaft).

In another possible embodiment, it is provided that the hydraulic system comprises at least two hydraulic pumps, which are arranged inside the hydraulic tank and are driven by the electric motor. All hydraulic pumps in the tank are connected directly or indirectly to the electric motor.

Optionally, the hydraulic pumps are arranged one behind the other, wherein only one of the hydraulic pumps may be attached to the electric motor or the intermediate piece. This means that the lateral expansion of the pump unit does not increase, so that it can be pushed through an opening in the tank housing as an assembly for the purpose of installation or replacement. The hydraulic pumps can be mounted on a common frame or bracket, which in turn is connected to the motor housing or the intermediate piece.

In another possible embodiment, it is provided that the working machine comprises a coolant circuit with a heat exchanger through which coolant flows, for example for cooling one or a plurality of energy storage devices and/or electronic components of the electric drive system and/or other components of the working machine. The heat exchanger is also arranged inside the hydraulic tank and surrounded by hydraulic oil, i.e. thermally coupled with it, so that heat can be exchanged between the coolant and hydraulic oil.

This makes it possible, for example, to cool the hydraulic oil and to supply waste heat from the hydraulic oil to the coolant circuit and, in particular, to dissipate it to the environment via a radiator of the working machine (or to heat other components of the working machine as a result). If the temperature of the hydraulic oil is below the coolant temperature, the hydraulic oil can be heated via the heat exchanger. The heat exchanger can be designed as a tubular coil, which compact connection to the electric motor and hydraulic pump unit.

In certain embodiments, by thermally coupling the hydraulic oil to the coolant circuit via the heat exchanger, it may be possible to convert the energy stored in the hydraulic oil into thermal energy in an intermediate step (by driving the hydraulic pump and circulating the hydraulic oil) in order to specifically discharge an energy storage device of the working machine and to dissipate this heat via the heat exchanger and the coolant circuit.

In another possible embodiment, it is provided that the heat exchanger is connected to coolant lines that are routed to the outside through the intermediate piece and/or a motor flange of the electric motor. Optionally, there are coolant feed-throughs on the intermediate piece (if this is provided) and/or on the motor flange, which are connected to the heat exchanger inside the hydraulic tank via internal coolant lines and to the coolant lines of the coolant circuit on the outside of the hydraulic tank via fluid connections. This allows the external coolant lines to be easily disconnected from the coolant feed-throughs or connections for maintenance or replacement of the hydraulic pump and/or the heat exchanger.

In another possible embodiment, it is provided that the hydraulic pump is arranged between the heat exchanger and the electric motor. In other words, the heat exchanger is optionally located behind the hydraulic pump from the perspective of the electric motor. This results in a compact design of the electric motor-hydraulic pump-heat exchanger unit, so that it can be inserted or removed as an assembly through an opening in the tank housing for the purpose of installation or replacement.

As already described, the heat exchanger is optionally designed as a tubular coil. In particular, this has a smaller diameter than a motor flange of the electric motor or the intermediate piece and thus, in particular, a smaller diameter than an opening formed in the tank housing, which is surrounded and sealed by the intermediate piece and/or motor flange, so that the tubular coil can be easily inserted into the hydraulic tank through this opening or pulled out of it.

In another possible embodiment, the electric motor is flange-mounted directly to the housing via a motor flange. Optionally, the hydraulic pump is flange-mounted directly to a motor housing of the electric motor from the inside of the hydraulic tank via a pump flange. This results in a particularly compact design of the motor-pump unit.

In an alternative possible embodiment, the electric motor is flange-mounted to the intermediate piece via a motor flange and the intermediate piece is flange-mounted to the housing of the hydraulic tank. The intermediate piece is optionally designed as an intermediate flange and optionally has a flat and/or circular shape. Optionally, the hydraulic pump is flange-mounted directly to the intermediate piece or intermediate flange from the inside of the hydraulic tank via a pump flange or flange-mounted directly to a motor housing of the electric motor within an opening of the intermediate piece.

In another possible embodiment, it is provided that the mobile working machine is designed as a bulldozer or crawler loader and has a crawler chassis and a driver's cab. The hydraulic tank with the integrated hydraulic pump and the attached electric motor is optionally located to the side next to, behind or in front of the driver's cab.

The crawler chassis optionally has laterally arranged crawler carriers, wherein each crawler chassis can optionally be designed separately via at least one drive unit (for example, an electric traction motor) of the electric drive system. The crawler chassis can be designed as a high drive (delta-shaped drive) or as a low drive (oval-shaped drive). The bulldozer or crawler loader has a dozer blade (front blade) at the front of the vehicle in particular. In an embodiment as a bulldozer, this can have additional equipment at the rear, such as a rear scarifier and/or a cable winch.

In another possible embodiment, it is provided that the electric motor and at least that part of the housing of the hydraulic tank to which the electric motor is attached is covered by an openable cover of the working machine. This means that the electric motor can be easily accessed and serviced or replaced by removing the motor flange or the intermediate piece from the tank housing and also the at least one hydraulic pump.

In another possible embodiment, it is provided that the electric drive system comprises at least one energy storage device and/or a fuel cell for supplying the electric motor with electric energy, wherein the working machine optionally has at least one electric traction drive.

The energy storage device can be configured to store electrical energy provided by the electric drive system (e.g. one or more traction motors operated in generator mode, for example during braking) (recuperation). The energy storage device can comprise at least one rechargeable battery and/or at least one battery, which can be designed as a lithium-ion battery.

The electric drive system can comprise one or more inverters and/or one or more additional electric motors.

BRIEF DESCRIPTION OF THE FIGURES

Further features, details and advantages of the disclosure result from the following exemplary embodiments explained with the help of the figures. In the drawings.

DETAILED DESCRIPTION

Figure 1:
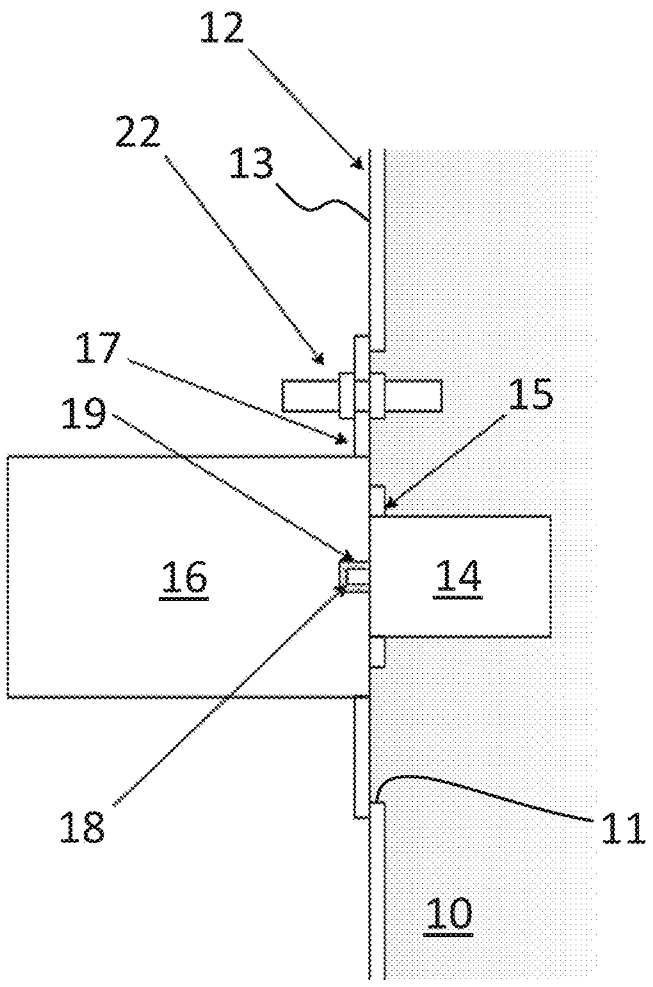
FIG. 1: shows a schematic side sectional view of a first exemplary embodiment of the arrangement of the hydraulic tank, electric motor and hydraulic pump of the working machine according to the disclosure.
Figure 2:
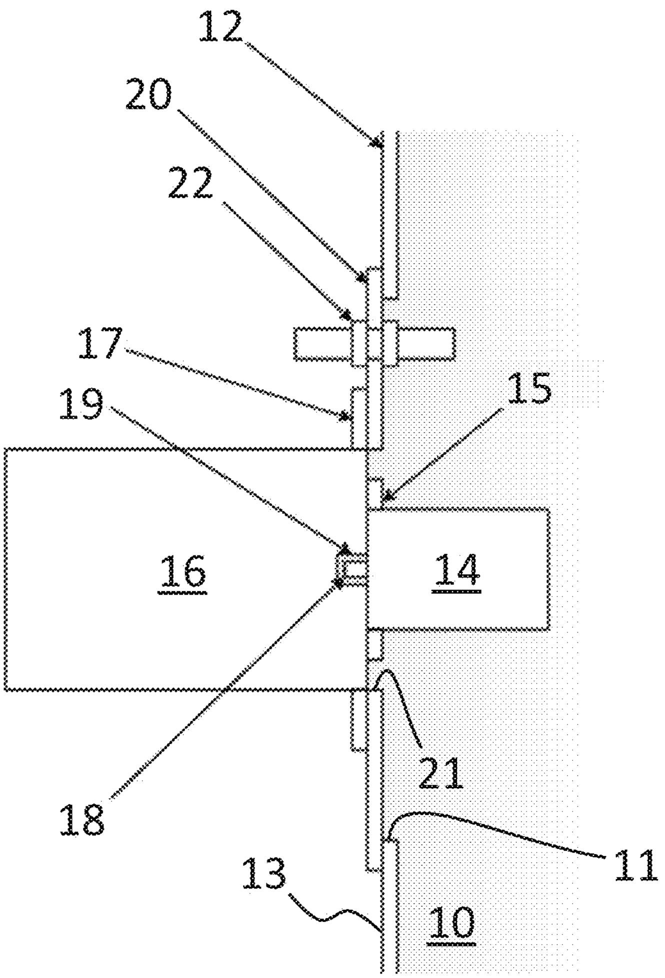
FIG. 2: shows a schematic side sectional view of a second exemplary embodiment of the arrangement of the hydraulic tank, electric motor and hydraulic pump of the working machine according to the disclosure.
Figure 3:
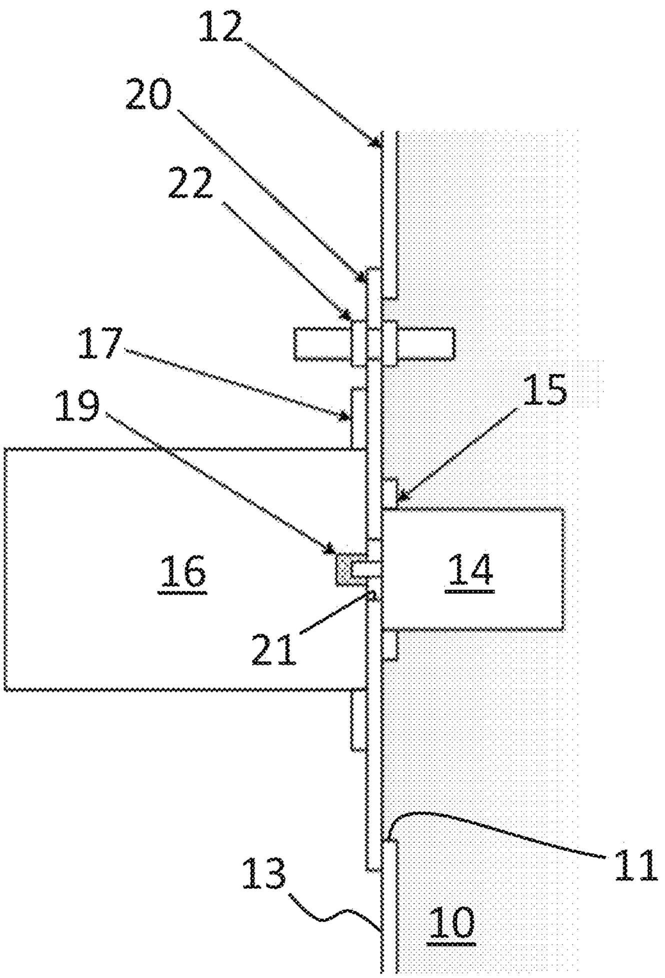
FIG. 3: shows a schematic side sectional view of a third exemplary embodiment of the arrangement of the hydraulic tank, electric motor and hydraulic pump of the working machine according to the disclosure.

FIGS. 1-3 schematically show three different exemplary embodiments of the arrangement of the hydraulic tank 12, electric motor 16 and hydraulic pump 14 of the working machine 1 according to the disclosure, wherein in each case a side view of a section through the arrangement along the motor shaft 19 is shown.

The hydraulic tank 12 is only partially shown here and comprises a housing 13, which can generally have any shape. Hydraulic oil 10 is located inside the housing 13. The hydraulic tank 12 is part of a hydraulic system of the working machine 1, which is used to supply one or more hydraulic consumers to provide at least one working function (e.g. moving a rear scarifier by means of hydraulic cylinders, lowering or raising a front blade by means of hydraulic cylinders or driving a hydraulic winch motor).

At least one hydraulic pump 14 is integrated into the hydraulic tank 12, which is surrounded by or immersed in the hydraulic oil 10. While only a single hydraulic pump 14 is shown in FIGS. 1-6, two or more hydraulic pumps 14 may alternatively be arranged in the hydraulic tank 12. The hydraulic pump 14 draws hydraulic oil 10 directly from the surrounding oil volume and pumps it into an output or pressure line (this is referred to below as the inner hydraulic line 24 and is shown as an example in FIGS. 5-6).

The hydraulic pump 14 is driven by an electric motor 16, which is attached to the outside of the housing 13 of the hydraulic tank 12. The electric motor 16 optionally has a circumferential motor flange 17. The hydraulic pump 14 optionally has a circumferential pump flange 15.

In the first exemplary embodiment of FIG. 1, the electric motor 16 is flange-mounted directly to the outside of the housing 13 via its motor flange 17. The hydraulic pump 14 is flange-mounted to the housing of the electric motor 16 (motor housing) via its pump flange 15. The electric motor 16 has an output shaft 19, which is mechanically connected to a drive shaft 18 of the hydraulic pump 14, such that it is driven by a rotary drive of the output shaft 19. The output shaft 19 is optionally designed as a hollow shaft, which is directly connected to the drive shaft 18, which is optionally designed as a toothed shaft. This results in a particularly compact design. Alternatively, the electric motor 16 and hydraulic pump 14 could be coupled together via a linkage and/or transmission.

The motor flange 17 has a hydraulic feed-through 22, which is connected on the inside of the tank, for example, to the inner hydraulic line 24 described above and not shown in FIG. 1. On the outside of the tank, the hydraulic feed-through 22 can have a hydraulic connection or alternatively be designed as a hydraulic connection in its entirety. An external hydraulic line (e.g. a hydraulic hose) of the hydraulic system is connected to this (not shown). The hydraulic connection allows the outer hydraulic line to be easily disconnected from the motor flange 17.

The fact that the pressure connection of the hydraulic pump 14 is routed via the flange surface simplifies the assembly of the motor-pump unit. This means that the hydraulic pump 14 can be easily serviced or replaced.

The housing 13 has a circular opening 11, which is surrounded by the motor flange 17. In the assembled state, the shafts 18, 19 of the electric motor 16 and hydraulic pump 14 run through the opening 11, optionally through the centre of the opening 11.

In particular, the opening 11 is dimensioned so that the entire unit or assembly comprising the electric motor 16 and hydraulic pump 14 can be removed from the hydraulic tank 12 by separating the motor flange 17 from the housing 13. The hydraulic pump 14 fits through the dimensions of the opening 11.

However, the opening 11 or the motor flange 17 does not necessarily have to have a circular shape, but can in principle have any shapes that are compatible with each other. This also applies to the intermediate piece 20 of the exemplary embodiments described below.

In the second exemplary embodiment of FIG. 2, the electric motor 16 is not flange-mounted directly to the housing 13 via the motor flange 17, but to an intermediate flange 20 (intermediate piece), wherein the intermediate flange 20 is flange-mounted to the outside of the housing 13. The optionally flat or plate-shaped intermediate flange 20 has a central and optionally circular opening 21, so that the hydraulic pump 14 can be flange-mounted directly to the motor housing of the electric motor 16 via its pump flange 15. The motor flange 17 surrounds the opening 21 of the intermediate flange 20. In this embodiment, the opening 11 of the housing 13 is dimensioned larger than when the electric motor 16 is mounted directly on the housing 13. The intermediate piece 20 therefore allows a larger opening 11 to be formed while the motor flange 17 remains the same, so that the hydraulic pump 14 can be dimensioned larger and/or other components such as a heat exchanger 30 can be installed in the hydraulic tank 12 and removed from it again through the opening 11.

As shown in the exemplary embodiment of FIG. 2, the hydraulic feed-through 22 described above may be arranged in the intermediate flange 20 rather than in the motor flange 17.

In the third exemplary embodiment of FIG. 3, the electric motor 16 is also flange-mounted to an intermediate flange 20 (intermediate piece) via the motor flange 17, wherein the intermediate flange 20 is flange-mounted to the outside of the housing 13. In contrast to the exemplary embodiment of FIG. 2, however, the hydraulic pump 14 is not flange-mounted directly to the motor housing of the electric motor 16, but instead to the intermediate flange 20 from the inside. The latter has a smaller opening 21 through which the drive shaft 18 of the hydraulic pump 14 passes and is connected to the output shaft 19 of the electric motor 16.

There are also several options for sealing the hydraulic oil. For example, a seal between the pump flange 15 and the motor housing and/or a seal between the output shaft 19 and the motor housing can be provided. In both variants, the motor flange 17 is optionally attached to the housing 13 or the intermediate flange 20 in an oil-tight manner.

Figure 4:
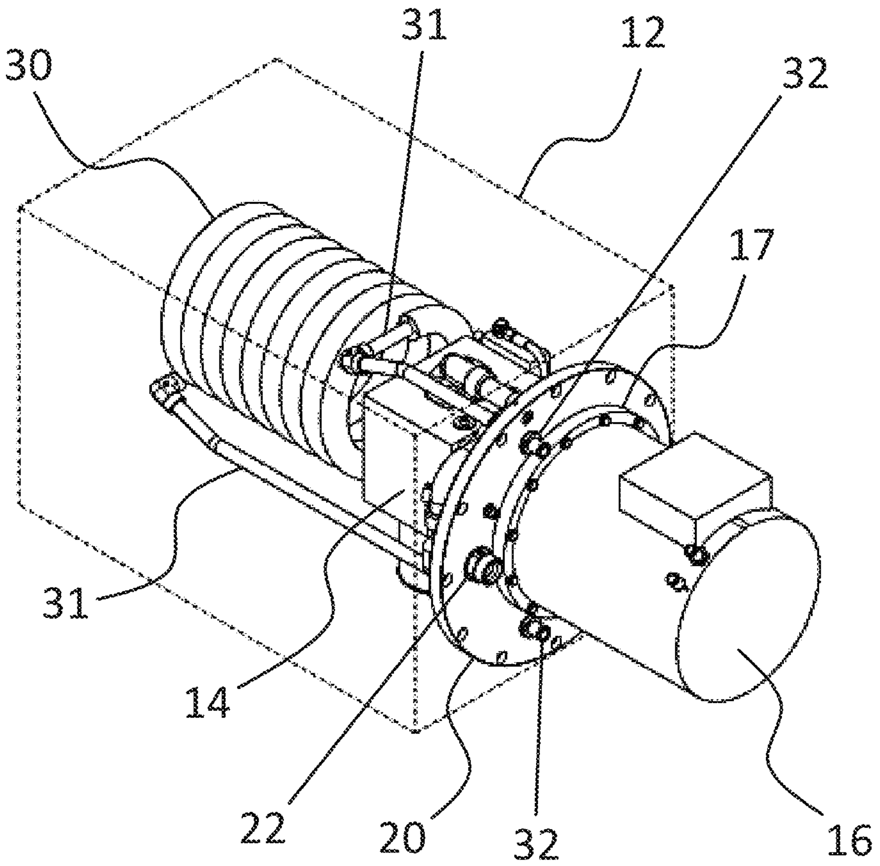
FIGS. 4-6: shows different detailed views of an exemplary embodiment of the arrangement of the hydraulic tank, electric motor and hydraulic pump of the working machine according to the disclosure.
Figure 5:
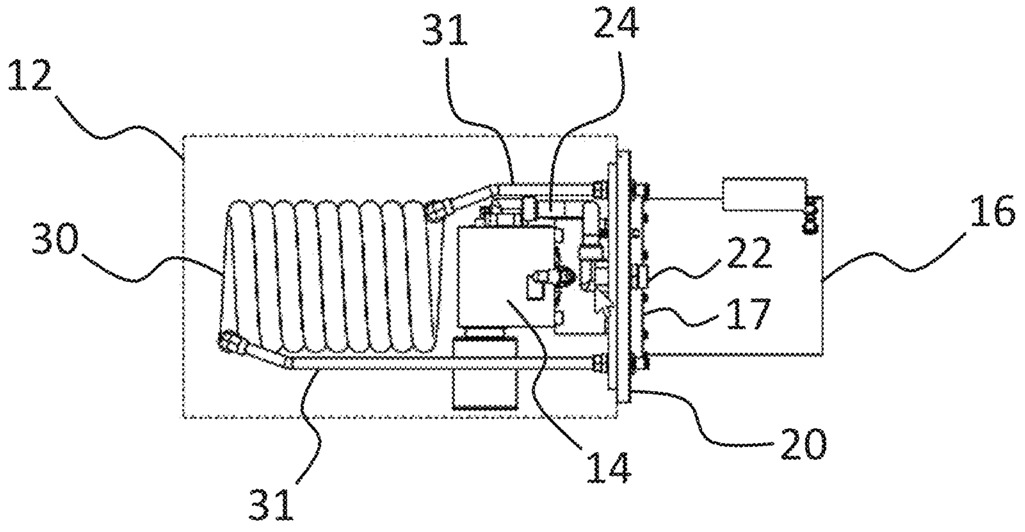
Figure 6:
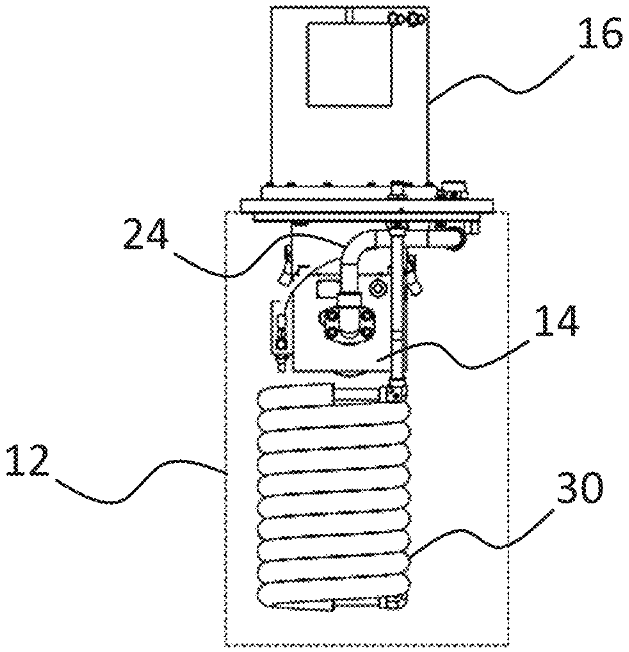

Another exemplary embodiment of the arrangement of the hydraulic tank 12, electric motor 16 and hydraulic pump 14 is shown in FIGS. 4-6 in a perspective view (FIG. 4), a side view (FIG. 5) and a top view (FIG. 6). The dotted line represents the tank volume. In this exemplary embodiment, in addition to the hydraulic pump 14, an oil-coolant heat exchanger 30 of a coolant circuit of the working machine 1 is integrated into the hydraulic tank 12 in the form of a tubular coil 30. The tubular coil 30 is flushed by a coolant so that heat can be exchanged between the coolant and the hydraulic oil 10.

In particular, the tubular coil 30 is designed in such a way that an ideal heat transfer can take place between the hydraulic oil 10 and the coolant. For this purpose, the heat exchanger 30 is optionally flushed with the return oil of the working hydraulics on the one hand and a large exchange surface on the other.

In this exemplary embodiment, the electric motor 16 is flange-mounted to an intermediate flange 20, which in turn is connected to the enveloping surface of the housing 13 of the hydraulic tank 12 or flange-mounted to it. FIGS. 5-6 show the inner hydraulic line 24, which connects the pressure outlet of the hydraulic pump 14 to the hydraulic feed-through 22.

The inlets and outlets of the heat exchanger 30 are connected to coolant ducts 32 via internal coolant lines 31 running inside the tank 12, and are also provided in the intermediate flange 20. This means that the coolant is replaced and the pumped hydraulic oil is fed through the flange surface, making it easy to remove/replace the unit.

In the exemplary embodiment of FIGS. 4-6, the tubular coil 30 is arranged on the side of the hydraulic pump 14 opposite the electric motor 16. This allows the entire assembly to be inserted or removed through the opening in the housing 13. The diameter of the tubular coil 30 is in particular smaller than the diameter of the intermediate flange 20 and also than that of the opening of the housing 13, which cannot be seen.

The orientation of the pump-motor unit can generally be horizontal or vertical.

In addition to the illustrations in FIGS. 1-6, it is also possible to connect a plurality of hydraulic pumps 14 in one behind the other ('inline').

Alternatively or additionally, it is possible to integrate a plurality of motor-pump units in a common hydraulic tank 12 with or without a heat exchanger 30.

Figure 7:
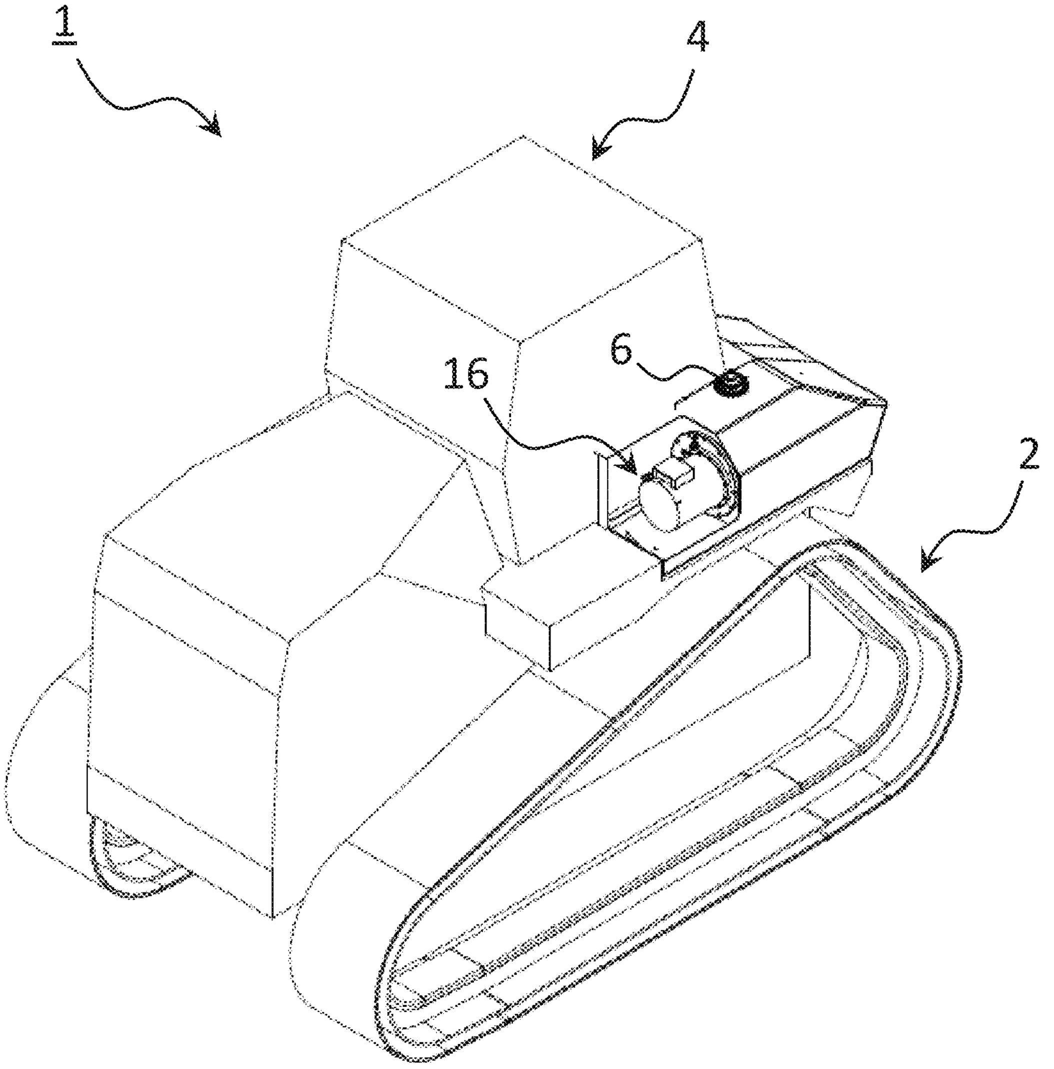
FIG. 7: shows a schematic perspective view of an exemplary embodiment of the working machine according to the disclosure.

FIG. 7 shows a schematic perspective view of an exemplary embodiment of the mobile working machine 1 according to the disclosure, which in this exemplary embodiment is a bulldozer. Other attachments such as a front blade or a rear scarifier are not shown. The bulldozer 1 has a crawler chassis 2 with lateral crawler carriers in high-drive design. Alternatively, the bulldozer 1 could also have another chassis, for example a crawler chassis in low-drive design. The weight of the bulldozer 1 can be between 10 and 125 tons, for example.

The bulldozer 1 of the exemplary embodiment shown has a driver's cab 4, wherein the hydraulic tank 12, electric motor 16 and hydraulic pump 14 can be arranged in the area of the driver's cab 4, for example, to the side of the driver's cab 4, as shown in FIG. 7, or also in front of or behind the driver's cab 4. Positions on the working machine 1 away from the driver's cab 4 are also conceivable. In the exemplary embodiment of FIG. 7, the electric motor 16 may be located under a removable or openable cover (not visible in FIG. 7). The hydraulic tank 12 can be filled via a filler neck 6 arranged on the outside of a cover (see FIG. 7).

The working machine 1 optionally has an energy storage device, which can be arranged under a machine cover between the driver's cab 4 and the front blade, for example. In particular, the energy storage device is used to supply energy to electric drive components of the electric drive system of the working machine 1, for example one or more electric traction motors, as well as the electric motor 16 of the hydraulic pump 14.

In the various exemplary embodiments of FIGS. 1-7, identical reference signs denote identical components or components with identical functions.

LIST OF REFERENCE NUMERALS

1 Mobile working machine
2 Crawler carrier

4 Driver's cab
6 Filler neck
10 Hydraulic oil
11 Opening in the housing of the hydraulic tank
12 Hydraulic tank
13 Housing of the hydraulic tank
14 Hydraulic pump
15 Pump flange
16 Electric motor
17 Motor flange
18 Hydraulic pump drive shaft
19 Electric motor drive shaft
20 Intermediate piece
21 Opening
22 Hydraulic feed-through
24 Hydraulic line
30 Heat exchanger
31 Coolant line
32 Coolant feed-through

The invention claimed is:

1. A mobile working machine, comprising:

a hydraulic system for providing a working function of the working machine, which comprises a hydraulic tank and at least one hydraulic pump, and an electric drive system with an electric motor for driving the hydraulic pump, wherein the hydraulic pump is arranged inside the hydraulic tank and the electric motor is arranged on the outside of a housing of the hydraulic tank, wherein the electric motor is flange-mounted directly or via an intermediate piece on the housing and the hydraulic pump is attached to the electric motor or to the intermediate piece, and further comprising a coolant circuit with a heat exchanger through which coolant flows and which is arranged inside the hydraulic tank so that heat can be exchanged between coolant and hydraulic oil, wherein coolant lines connected to the heat exchanger are guided through the intermediate piece and/or a motor flange of the electric motor, and wherein the intermediate piece and/or the motor flange have coolant feed-throughs, which are connected to the heat exchanger inside the hydraulic tank and to the coolant lines of the coolant circuit on the outside of the hydraulic tank via fluid connection.

2. The mobile working machine according to claim 1, wherein the hydraulic pump is immersed in hydraulic oil and draws the hydraulic oil directly from the hydraulic tank, wherein the electric motor comprises a rotor and a stator that are not in contact with hydraulic oil.

3. The mobile working machine according to claim 1, wherein the intermediate piece is designed as an intermediate flange and is flange-mounted to the housing and/or wherein the intermediate piece has an opening through which a mechanical coupling is guided between the electric motor and the hydraulic pump.

4. The mobile working machine according to claim 3, wherein the mechanical coupling is a shaft.

5. The mobile working machine according to claim 1, wherein the intermediate piece and/or a motor flange of the electric motor has at least one hydraulic feed-through, which is connected to a pressure outlet of the hydraulic pump inside the hydraulic tank.

6. The mobile working machine according to claim 5, wherein the at least one hydraulic feed-through on the outside of the hydraulic tank is connected to a hydraulic line of the working machine via a hydraulic connection.

7. The mobile working machine according to claim 1, wherein the electric motor comprises a rotationally drivable output shaft to which a drive shaft of the hydraulic pump is connected directly or via a coupling linkage and/or transmission.

8. The mobile working machine according to claim 7, wherein an outlet of the output shaft from a motor housing of the electric motor and/or an attachment between the hydraulic pump and the electric motor is designed to be oil-tight.

9. The mobile working machine according to claim 7, wherein the output shaft is designed as a hollow shaft.

10. The mobile working machine according to claim 1, wherein at least two hydraulic pumps mechanically coupled to the electric motor are arranged inside the hydraulic tank.

11. The mobile working machine according to claim 10, wherein the at least two hydraulic pumps are arranged one behind the other and only one of the at least two hydraulic pumps is attached to the electric motor or the intermediate piece.

12. The mobile working machine according to claim 1, wherein the electric motor is directly flange-mounted to the housing of the hydraulic tank via a motor flange, and wherein the hydraulic pump is directly flange-mounted to a motor housing of the electric motor via a pump flange.

13. The mobile working machine according to claim 1, wherein the electric motor is flange-mounted to the intermediate piece via a motor flange and the intermediate piece is flange-mounted to the housing of the hydraulic tank, and wherein the hydraulic pump is flange-mounted directly to the intermediate piece via a pump flange or directly to a motor housing of the electric motor within an opening of the intermediate piece.

14. The mobile working machine according to claim 1, which is designed as a bulldozer or crawler loader and has a crawler chassis and a driver's cab, wherein the hydraulic tank is arranged laterally next to, behind, or in front of the driver's cab.

15. The mobile working machine according to claim 1, wherein the electric motor and at least a part of the housing of the hydraulic tank to which the electric motor is attached is covered by an openable cover of the working machine.

16. The mobile working machine according to claim 1, wherein the electric drive system comprises at least one energy storage device and/or a fuel cell for supplying the electric motor with electric energy, wherein the working machine has at least one electric traction drive.

17. The mobile working machine according to claim 1, wherein the mobile working machine is a bulldozer or crawler loader.

18. A mobile working machine, comprising:

a hydraulic system for providing a working function of the working machine, which comprises a hydraulic tank and at least one hydraulic pump, and an electric drive system with an electric motor for driving the hydraulic pump, wherein the hydraulic pump is arranged inside the hydraulic tank and the electric motor is arranged on the outside of a housing of the hydraulic tank, wherein the electric motor is flange-mounted directly or via an intermediate piece on the housing and the hydraulic pump is attached to the electric motor or to the intermediate piece, and further comprising a coolant circuit with a heat exchanger through which coolant flows and which is arranged inside the hydraulic tank so that heat can be exchanged between coolant and hydraulic oil, wherein the hydraulic pump is arranged between the heat exchanger and the electric motor, wherein the heat exchanger is designed as a tubular coil and has a smaller diameter than a motor flange of the electric motor or the intermediate piece.

* * * * *